E. B. LIGHT.
Whip-Lashes and Snaps.
No. 133,946. Patented Dec. 17, 1872.
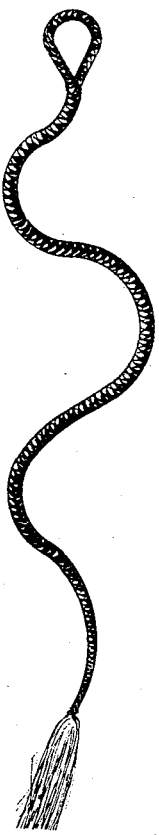

UNITED STATES PATENT OFFICE.

EDWARD B. LIGHT, OF WESTFIELD, MASSACHUSETTS.

IMPROVEMENT IN WHIP LASHES AND SNAPS.

Specification forming part of Letters Patent No. 133,946, dated December 17, 1872.

*To all whom it may concern:*

Be it known that I, EDWARD B. LIGHT, of Westfield, Hampden county, State of Massachusetts, have invented an Improvement in Whip-Lashes and Whip-Snaps, of which the following is a specification:

My invention includes improvements upon a former invention for which Letters Patent were granted me February 27, 1872, and numbered 124,070, for whip-lashes, in which a lash was made, to a certain extent, water-proof by a coating or covering of impervious material applied under the outer plaiting; and my invention now consists in making entirely water-proof any flexible plaited or woven lash throughout all of its parts—loop, body, covering, and snap, as well as the snap of a whip—by saturating them with a water-proof adhesive material; the effect of which application is to render such parts water-proof, also, at the same time, increasing their durability by causing the fibers or strands to adhere to each other so as to resist any tendency to become frayed out by use, and without interfering with their flexibility.

As an adhesive water-proof material in which to saturate the otherwise completed whip-lash, or part of the same, or whip-snap, I prefer rubber cement or some preparation of gutta-percha, as combining more nearly the requisite qualities, though without confining myself to the use of the same.

In the drawing is shown a portion of whip-lash or whip-snap embodying my improvement.

Now, having described my invention, what I claim is—

As a new article of manufacture, a whip-lash and a whip-snap saturated with a water-proof adhesive material for the purpose of rendering the same water-proof and prevent the same from fraying out by use.

EDW. B. LIGHT.

Witnesses:
    A. AVERY,
    E. P. TINKER.